(12) United States Patent
Tzur et al.

(10) Patent No.: US 10,289,958 B1
(45) Date of Patent: May 14, 2019

(54) STORAGE SYSTEM WITH MACHINE LEARNING BASED SKEW PREDICTION

(71) Applicant: EMC Corporation, Hopkinton, MA (US)

(72) Inventors: Anat Parush Tzur, Beer-Sheva (IL); Arik Sapojnik, Beer-Sheva (IL); Nimrod Milo, Gedera (IL); Assaf Natanzon, Tel Aviv (IL); Nir Goldschmidt, Hertzliya (IL); Otniel Van-Handel, Modiin Elite (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 705 days.

(21) Appl. No.: 14/868,618

(22) Filed: Sep. 29, 2015

(51) Int. Cl.
*G06N 5/04* (2006.01)
*G06N 20/00* (2019.01)

(52) U.S. Cl.
CPC ............... *G06N 20/00* (2019.01); *G06N 5/04* (2013.01)

(58) Field of Classification Search
None
See application file for complete search history.

(56) References Cited

PUBLICATIONS

Little, et al., An Intermedia Skew Control System for Multimedia Data Presentation, Multimedia Communications Laboratory, MCL Technical Report Nov. 1, 1992, Proc. 3rd Intl. Workshop on Network and Operating System Support for Digital Audio and Video, La Jolla, CA, Nov. 1992, pp. 121-132 (Year: 1992).*
EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

* cited by examiner

*Primary Examiner* — Wilbert L Starks
(74) *Attorney, Agent, or Firm* — Ryan, Mason & Lewis, LLP

(57) ABSTRACT

An apparatus comprises a plurality of storage tiers, at least one data mover module, and a machine learning system coupled to the data mover module. The machine learning system comprises a model generator and a skew predictor. The model generator processes information characterizing input-output activity involving one or more of the storage tiers in order to obtain skew measurements in different time granularities, with the skew measurements indicating portions of the input-output activity directed to portions of the storage tier(s), and generates a predictive model from the skew measurements. The skew predictor is configured in accordance with the predictive model to convert skew measurements in one of the time granularities to corresponding skew measurements in another one of the time granularities. One or more of the converted skew measurements are utilized by the data mover module in controlling transfer of data between the storage tiers.

20 Claims, 5 Drawing Sheets

STORAGE SYSTEM WITH MACHINE LEARNING BASED SKEW PREDICTION

FIELD

The field relates generally to storage systems, and more particularly to storage systems that incorporate multiple storage tiers.

BACKGROUND

Many storage systems are configured to include multiple storage tiers, with different ones of the tiers providing different levels of input-output (JO) performance or other characteristics. In such systems, data may be moved from one tier to another within a given storage system based on access frequency of the data or other factors. For example, some systems are configured to utilize multiple storage tiers having different types of disk drives in order to improve performance while reducing cost. This is achieved by putting the more active ("hot") data on faster but more expensive disk drives and the less active ("cold") data on slower but cheaper disk drives. Such an arrangement is a type of fully automated storage tiering (FAST). Data can also be moved between storage tiers in conjunction with a planned migration from one storage system to another storage system. For example, in such a migration context, the tiers may comprise respective storage arrays in different storage systems.

SUMMARY

Illustrative embodiments of the present invention provide storage systems that implement machine learning based skew prediction for use in controlling movement of data between storage tiers.

In one embodiment, an apparatus comprises a plurality of storage tiers each comprising a plurality of storage drives, at least one data mover module coupled to the storage tiers and configured to control transfer of data between the storage tiers, and a machine learning system coupled to the at least one data mover module.

The machine learning system comprises a model generator and a skew predictor. The model generator is configured to process information characterizing IO activity involving one or more of the storage tiers in order to obtain skew measurements in a plurality of different time granularities, with the skew measurements indicating portions of the IO activity directed to portions of the one or more storage tiers, and to generate a predictive model from the skew measurements.

A given one of the skew measurements may specify, for example, a particular percentage of IO activity associated with a particular percentage of data storage capacity in a designated portion of at least one of the storage tiers.

The skew predictor is configured in accordance with the predictive model generated by the model generator to convert skew measurements in one of the time granularities to corresponding skew measurements in another one of the time granularities. One or more of the converted skew measurements are utilized by the at least one data mover module in controlling transfer of data between the storage tiers.

A wide variety of different data movement scenarios can be controlled using the converted skew measurements. For example, such converted skew measurements can be used when moving data from a storage tier associated with one time granularity to a storage tier associated with a different time granularity. Some movement scenarios involve dynamic movement of data between storage tiers in conjunction with the ordinary operation of a given multi-tier storage system. Other movement scenarios relate to migration of data from a storage tier of one storage system to a storage tier of another storage system. Such migration may be associated with static storage planning.

In these and other scenarios, skew measurements made for a given set of data using one of the time granularities on one of the storage tiers can be used by the skew predictor to predict what the skew measurements will be for the given data set if the data set were moved to another one of the storage tiers that has a different time granularity for computing skew measurements. Such converted skew measurements can be used by a data mover module to guide data movement decisions involving the data set.

Illustrative embodiments described herein provide significant improvements relative to conventional arrangements. For example, one or more such embodiments can improve the performance of a multi-tier storage system by providing more accurate and efficient movement of data based on predicted skew measurements.

These and other embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
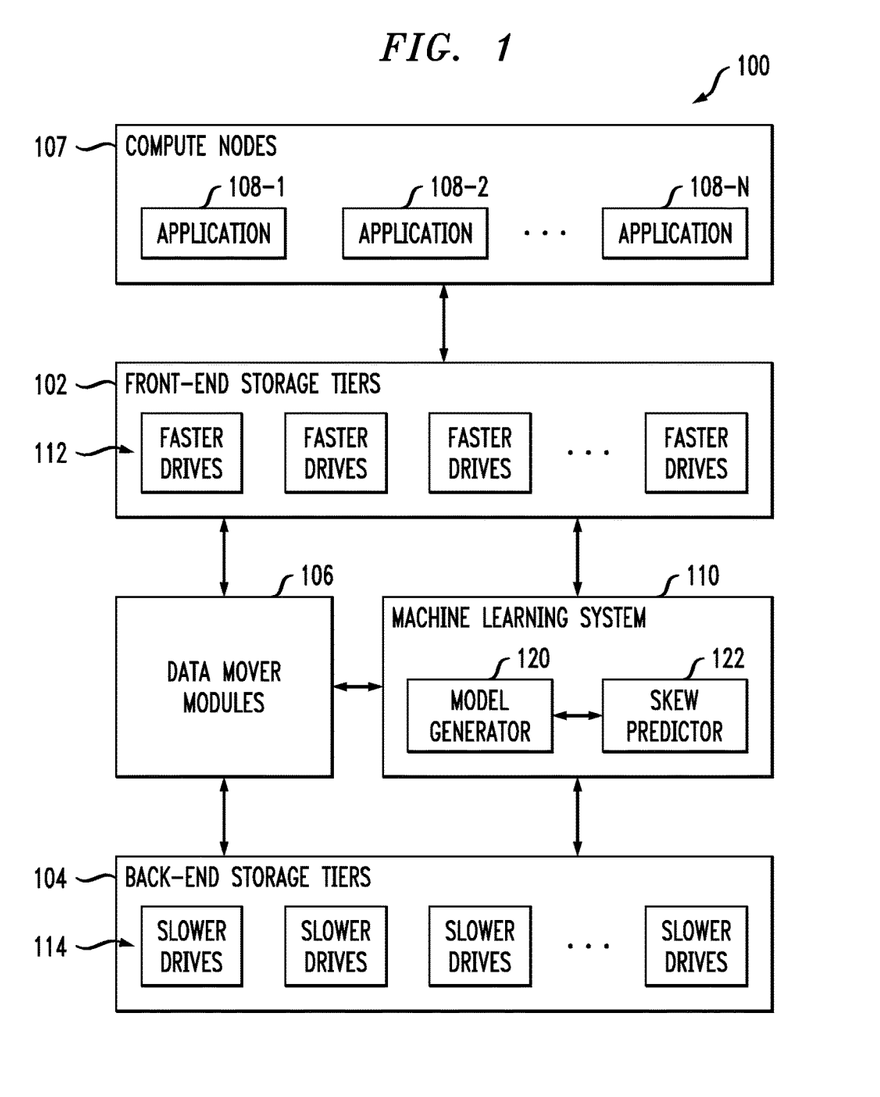
FIG. 1 is a block diagram of an information processing system comprising a tiered storage system with machine learning based skew prediction in an illustrative embodiment of the invention.

FIG. 1 shows an information processing system 100 configured in accordance with an illustrative embodiment of the present invention. The information processing system 100 comprises front-end storage tiers 102, back-end storage tiers 104 and a plurality of data mover modules 106 coupled to the front-end and back-end storage tiers 102 and 104. The information processing system 100 further comprises a set of compute nodes 107 that collectively run a plurality of applications 108-1, 108-2, . . . 108-N. The system 100 additionally comprises a machine learning system 110 coupled to the storage tiers 102 and 104 and to the data mover modules 106.

The applications 108 generate IO activity such as data reads or data writes involving data stored in at least a subset of the storage tiers 102 and 104. Accordingly, the applications 108 read data from and write data to one or more of the storage tiers. The compute nodes 107 may be associated with respective users of the system 100. In such an arrangement, the compute nodes 107 may comprise respective user devices such as mobile telephones or laptop, tablet or desktop computers. As another example, the compute nodes 107 may be respective computers in a cluster of computers associated with a supercomputer or other high performance computing (HPC) system.

Although multiple data mover modules 106 are shown in this embodiment, other embodiments can include only a single data mover module. The data mover modules 106 are illustratively coupled to the storage tiers 102 and 104 and configured to control transfer of data between the storage tiers. A given data mover module can be implemented at least in part on storage arrays or other storage platforms that implement at least portions of one or more of the storage tiers 102 and 104.

Each of the storage tiers 102 and 104 in the FIG. 1 embodiment comprises a plurality of storage drives with different types of storage drives being used in different ones of the storage tiers. More particularly, the front-end storage tiers 102 illustratively comprise faster drives 112 relative to slower drives 114 of the back-end storage tiers 104. For example, relatively fast disk drives can be used as the faster drives 112 and relatively slow disk drives can be used as the slower drives 114, as in the previously-mentioned FAST arrangement.

As another example, the faster drives 112 may comprise flash drives while the slower drives 114 comprise disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The drives 112 are generally significantly faster in terms of read and write access times than the drives 114. The drives 112 are therefore considered "faster" in this embodiment relative to the "slower" drives 114. Accordingly, the present embodiment has one or more "fast" storage tiers and one or more "slow" storage tiers, where "fast" and "slow" in this context are relative terms and not intended to denote any particular absolute performance level. However, numerous alternative tiering arrangements may be used, including arrangements with three or more tiers each providing a different level of performance. For example, various alternative FAST configurations can be used in embodiments of the invention.

Also, it is to be appreciated that other embodiments can include only a single front-end storage tier and a single back-end storage tier. Moreover, the various tiers of a given multi-tier storage system in other embodiments need not be arranged as respective front-end and back-end storage tiers. Accordingly, numerous alternative storage tiering arrangements can be used in other embodiments. Thus, embodiments of the invention are not limited to front-end and back-end storage tiers as illustrated in FIG. 1, but can more generally utilize one or more storage systems collectively comprising any arrangement of multiple storage tiers.

The data mover modules 106 may be configured to control movement of data between the front-end and back-end storage tiers 102 and 104 in order to facilitate achievement of desired levels of performance by the users.

The "users" in this embodiment may refer, for example, to respective ones of the compute nodes 107, although the term "user" as utilized herein is intended to be broadly construed so as to encompass numerous other arrangements of human, hardware, software or firmware entities, as well as combinations of such entities.

The data mover modules 106 can communicate with the front-end and back-end storage tiers via one or more application programming interfaces (APIs) or other types of communication media.

The storage tiers 102 and 104 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types. A given storage platform may comprise storage arrays such as VNX® and Symmetrix VMAX® storage arrays, both commercially available from EMC Corporation of Hopkinton, Mass. Other types of storage products that can be used in implementing a given storage platform in an illustrative embodiment include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

These and other storage platforms can be part of what is more generally referred to herein as a processing platform comprising one or more processing devices each comprising a processor coupled to a memory. The data mover modules 106 may be implemented at least in part using processing devices of such platforms.

The machine learning system 110 comprises a model generator 120 and a skew predictor 122. The model generator 120 is configured to process information characterizing IO activity involving the storage tiers 102 and 104 in order to obtain skew measurements in a plurality of different time granularities with the skew measurements indicating portions of the IO activity directed to portions of the storage tiers.

The different time granularities illustratively comprise at least a first time granularity specified as a first time period having a first number of hours and a second time granularity specified as a second time period having a second number of hours different than the first number of hours. For example, the time granularities may comprise respective 6-hour ("6H") and 12-hour ("12H") granularities. Other types and arrangements of multiple distinct time granularities can be used in other embodiments.

Accurate skew measurements are important in determining an optimal distribution of data across the various storage tiers. Such measurements are also important in data migration decisions, storage upgrade decisions, and in numerous other contexts relating to appropriate placement of data on storage devices.

A given one of the skew measurements may specify a particular percentage of IO activity associated with a particular percentage of data storage capacity in a designated portion of at least one of the storage tiers. For example, a skew measurement can indicate that 80% of the IO activity aggregated over a particular period of time given by the time granularity is associated with 20% of the storage capacity, which would be considered a relatively high level of skew within the system. Such a skew measurement may be represented, for example, as a point in two-dimensional space having a first dimension given by aggregate IO ratio and a second dimension given by capacity ratio. Examples of skew measurements of this type will be described below in conjunction with the graphical plots of FIG. 5 that compare measured and predicted skew in illustrative embodiments.

The model generator 120 also generates a predictive model from the skew measurements. By way of example, the predictive model may be configured to utilize first and second skew measurements of a first one of the time granularities to predict a corresponding skew measurement in a second one of the time granularities.

The skew predictor 122 is configured in accordance with the predictive model generated by the model generator 120 to convert skew measurements in one of the time granularities to corresponding skew measurements in another one of the time granularities. Thus, for example, skew measurements made using a 12H time granularity can be converted to skew measurements in a 6H time granularity, or vice-versa. As noted above, the time granularity in such arrangements generally indicates the time period over which the IO activity is aggregated in making the skew measurement.

The predictive model in some embodiments comprises one or more conversion tables for use by the skew predictor 122 in converting skew measurements in one of the time granularities to skew measurements in another one of the time granularities.

One or more of the resulting converted skew measurements are utilized by the data mover modules 106 in controlling transfer of data between the storage tiers 102 and 104.

A wide variety of different data movement scenarios can be controlled using the converted skew measurements. For example, such converted skew measurements can be used when moving data from a storage tier associated with one time granularity to a storage tier associated with a different time granularity.

Some movement scenarios involve dynamic movement of data between storage tiers in conjunction with the ordinary operation of a given multi-tier storage system such as system 100. Assume in such an arrangement that the different storage tiers are associated with different storage arrays that have different time granularities for computing skew. In other words, first and second storage tiers are part of respective different storage arrays that utilize respective different ones of the time granularities for generation of skew measurements. Such an arrangement can arise, for example, in so-called "sideways" storage tiering at the data center level, where each tier comprises a separate storage array.

In these and other similar arrangements, skew measurements made for a given set of data using one of the time granularities on one of the storage tiers can be used by the skew predictor 122 to predict what the skew measurements will be for the given data set if the data set were moved to another one of the storage tiers that has a different time granularity for computing skew measurements. Such converted skew measurements can be used by the data mover modules 106 to make intelligent decisions regarding dynamic movement of data during ordinary operation of the multi-tier storage system.

Other movement scenarios relate to migration of data from a storage tier of one storage system to a storage tier of another storage system. Such migration may be associated with static storage planning within an information processing system. In an arrangement of this type, the data mover modules 106 are configured to control migration of at least a portion of the data from one or more of the storage tiers in a first storage system that utilizes a first time granularity for generation of skew measurements to one or more other storage tiers of a different storage system that utilizes a different time granularity for generation of skew measurements. Thus, the storage tiers 102 and 104 in some embodiments can be viewed as being parts of different storage systems rather than part of a single storage system.

Moreover, it is possible that the different storage systems can each include only a single storage tier in the form of a single storage array. The term "multi-tier storage system" as used herein is intended to be broadly construed so as to encompass two or more separate storage systems each comprising a single storage array. The term "storage tier" as used herein is also intended to be broadly construed, and may comprise, for example, a single storage array or a single-tier storage system.

As a more particular example of a movement scenario relating to static storage planning, in the information processing system 100, skew measurements made for a storage array of a first type, such as a Symmetrix VMAX® storage array which operates at a first time granularity denoted X, are used to predict the skew that will result if the corresponding data were moved to a storage array of a second type, such as a VNX® storage array which operates at a second time granularity denoted Y, where X≠Y. The storage arrays in this example are generally configured to support automatic storage tiering using skew measurements based on a particular predetermined time granularity.

Again, in these and other similar arrangements, skew measurements made for a given set of data using one of the time granularities on one of the storage tiers can be used by the skew predictor 122 to predict what the skew measurements will be for the given data set if the data set were moved to another one of the storage tiers that has a different time granularity for computing skew measurements. Such converted skew measurements can be used by the data mover modules 106 to make intelligent decisions regarding migration of data as part of a static storage planning operation.

The front-end storage tiers 102 and back-end storage tiers 104 in some embodiments collectively comprise multiple hierarchical storage tiers for use in hierarchical storage management (HSM). One or more of the storage tiers in each of the front-end and back-end storage tiers 102 and 104 may be associated with a distinct file system. For example, one or more of such tiers may be associated with a cluster file system, distributed file system or parallel file system. Numerous other types and arrangements of file systems can be used in implementing the front-end and back-end storage tiers in a given embodiment.

As noted above, the FIG. 1 embodiment can be configured to provide support for a wide variety of different types of front-end and back-end storage tiers 102 and 104. For example, a given implementation can include multiple distinct cloud-based storage tiers as at least a subset of the back-end storage tiers 104, possibly implemented in geographically distributed locations using different storage products from different vendors.

The front-end storage tiers 102 in some embodiments are configured to include at least one HSM API for communicating with one or more of the data mover modules 106. Through such an HSM API, a given one of the data mover modules 106 may be provided with information that allows it to control archiving, backing up, restoring and other movement of data between front-end and back-end storage tiers.

By way of example, a given one of the data mover modules 106 may be configured in the form of a multi-threaded application that communicates with a corresponding HSM API of the front-end storage tiers 102. The information received in the given data mover module via the HSM API illustratively comprises commands to move files from the front-end storage tiers 102 to the back-end storage tiers 104 and vice-versa. In other embodiments, the front-end storage tiers 102 need not include any HSM APIs, and can instead utilize other types of interfaces for communicating with the data mover modules 106.

The term "data movement" as used in this and other contexts herein is intended to be broadly construed, so as to encompass data migration as well as other types of movement of data between storage tiers.

The data mover modules 106 are adapted for communication with the front-end storage tiers 102, possibly via HSM APIs of the type noted above. For example, a given one of the data mover modules 106 may be configured to control movement of data between the front-end storage tiers 102 and the back-end storage tiers 104 responsive to information received via a corresponding one of the HSM APIs.

The data mover modules 106 can also be configured to update stored metadata responsive to movement of data between the storage tiers 102 and 104.

It was noted above that data stored in the storage tiers 102 and 104 may be migrated between multiple storage tiers as necessary to facilitate achievement of desired performance levels. For example, in the FIG. 1 embodiment, the data mover modules 106 may migrate data between multiple storage tiers of the front-end and back-end storage tiers in order to achieve desired levels of IO performance for system users.

Data migration and other data movement determinations may be based at least in part on monitoring of current levels of performance within the system 100. Such monitoring in the FIG. 1 embodiment is assumed to be performed under the direction of a front-end file system and may involve the use of sensors of a sensor network, or various other types of monitoring arrangements. The particular types of operating conditions and other factors that are monitored can be varied depending upon the needs of a given implementation.

If the desired levels of performance have not been achieved, the manner in which the data is stored across the front-end and back-end storage tiers 102 and 104 can be altered. In the context of the FIG. 1 embodiment, this generally involves the data mover modules 106 executing an alternative storage arrangement, possibly responsive to information received via HSM APIs, so as to facilitate achievement of the desired levels of performance in the system 100.

If the desired levels have been achieved, the data mover modules 106 continue to control the flow of data between the front-end and back-end storage tiers. The above-noted determination as to whether or not desired levels of performance have been achieved is then repeated periodically and further adjustment of the manner in which the data are distributed over the front-end and back-end storage tiers 102 and 104 is made by the data mover modules 106 as needed, possibly in response to changing operating conditions and other factors.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the storage tiers 102 and 104, the data mover modules 106, the compute nodes 107 and the machine learning system 110 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines or other types of virtualization infrastructure such as Docker containers.

Although shown in FIG. 1 as being separate from the storage tiers 102 and 104 and compute nodes 107, the data mover modules 106 in other embodiments may be implemented at least in part within one or more of these system elements. For example, the data mover modules 106 can be implemented at least in part within one or more of the storage tiers 102 and 104 or within the compute nodes 107.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagrams of FIGS. 2 and 3.

Figure 2:
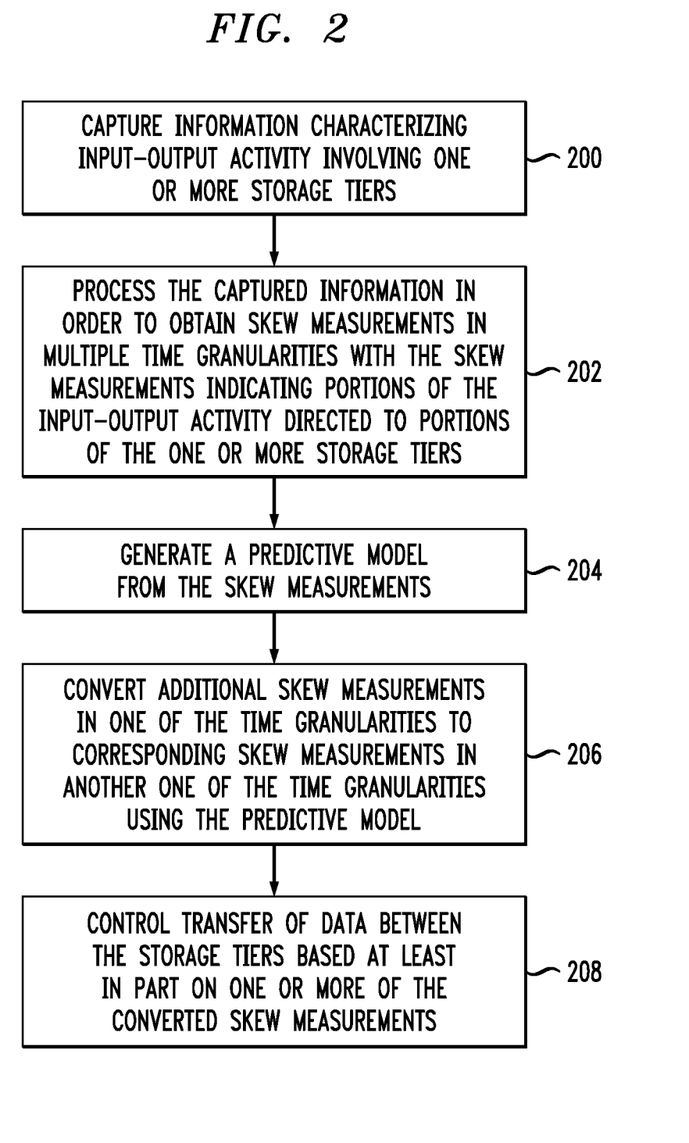
FIG. 2 is a flow diagram of a skew prediction and data movement process implemented in an information processing system in an illustrative embodiment.

Referring initially to FIG. 2, the process as shown includes steps 200 through 208, and is suitable for use in the system 100 but is more generally applicable to other types of systems comprising multiple storage tiers, at least one associated data mover module and a machine learning system.

In step 200, information characterizing IO activity involving one or more storage tiers of a multi-tier storage system is captured. As noted above, the storage tiers may comprise different storage arrays or other storage products that utilize different time granularities for generation of skew measurements.

In step 202, the captured information is processed in order to obtain skew measurements in a plurality of different time granularities with the skew measurements indicating portions of the IO activity directed to portions of the one or more storage tiers. As mentioned previously, a given one of the skew measurements may specify a particular percentage of IO activity associated with a particular percentage of data storage capacity in a designated portion of at least one of the storage tiers, although other types of skew measurements can be used.

In step 204, a predictive model is generated from the skew measurements. A more detailed example of the generation of the predictive model will be described below in conjunction with the flow diagram of FIG. 3. By way of example, the predictive model may utilize first and second skew measurements of a first one of the time granularities to predict a corresponding skew measurement in a second one of the time granularities.

In step 206, additional skew measurements in one of the time granularities are converted to corresponding skew measurements in another one of the time granularities using the predictive model. This may involve configuring the predictive model to include a plurality of conversion tables for use in converting skew measurements in one of the time granularities to skew measurements in another one of the time granularities. Such conversion tables can improve both the speed and the accuracy of the skew prediction. Conversion tables can be reused for different system implementations and can be periodically regenerated to reflect updates to the predictive model.

The converted skew measurements are also referred to herein as "predicted skew measurements" as they are generated using a predictive model that is trained based on actual skew measurements.

In step 208, transfer of data between the storage tiers is controlled based at least in part on one or more of the converted skew measurements.

As noted above, a wide variety of different data movement scenarios can be controlled using the converted skew measurements. For example, such converted skew measurements can be used when moving data from a storage tier associated with one time granularity to a storage tier associated with a different time granularity. Some movement scenarios involve dynamic movement of data between storage tiers in conjunction with the ordinary operation of a given multi-tier storage system. Other movement scenarios relate to migration of data from a storage tier of one storage system to a storage tier of another storage system. Such migration may be associated with static storage planning.

In these and other scenarios, skew measurements made for a given set of data using one of the time granularities on one of the storage tiers can be used by the skew predictor 122 to predict what the skew measurements will be for the given data set if the data set were moved to another one of the storage tiers that has a different time granularity for computing skew measurements. Such converted skew measurements can be used by the data mover modules 106 to guide data movement decisions involving the data set.

Figure 3:
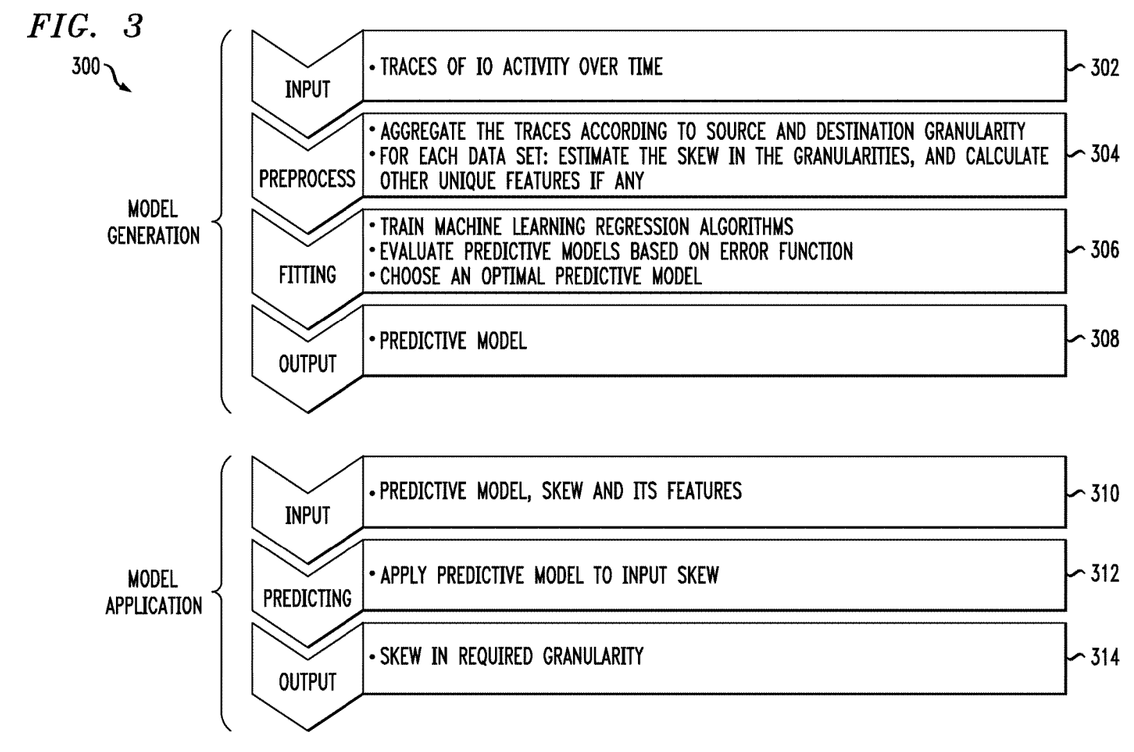
FIG. 3 illustrates example process steps associated with generation and application of a predictive model for skew prediction in an illustrative embodiment.

Referring now to FIG. 3, the process 300 as shown includes steps 302 through 314, and is suitable for use in the system 100 but is more generally applicable to other types of systems comprising multiple storage tiers, at least one associated data mover module and a machine learning system. The process 300 represents an example implementation of steps 204 and 206 of the FIG. 2 process. More particularly, steps 302 through 308 generate a predictive model using traces of IO activity over time, and accordingly involve fitting a predictive model to the traces of IO activity. Steps 310 through 314 apply the predictive model to particular input in the form of skew measurements in one time granularity and provide as an output converted skew measurements in another time granularity. Each of steps 302 through 314 will be described in more detail below.

In step 302, input in the form of traces of IO activity over time is obtained. These traces are examples of what is more generally referred to herein as information characterizing IO activity involving multiple storage tiers, although other types of such information can be used. In the present embodiment, it is assumed that each such trace relates to a particular logical unit number (LUN) of at least one of the storage tiers.

Figure 4:
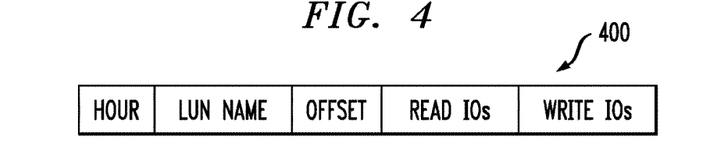
FIG. 4 shows an example of an IO activity trace format in an illustrative embodiment.

An example of an IO activity trace format is shown in FIG. 4. In this example, a given one of the traces 400 comprises a time period identifier, a LUN identifier, an offset, a number of read operations directed to the offset of the identified LUN for the identified time period and a number of write operations directed to the offset of the identified LUN for the identified time period. More particularly, the time period identifier in this example identifies a particular hour, although other time periods could be used. Also, the LUN identifier is referred to in this example as LUN name, and the numbers of read and write operations are referred to in this example as read IOs and write IOs, respectively. It is to be appreciated, however, that this particular trace format is only an example, and other types of traces or more generally information characterizing IO activity involving one or more storage tiers can be used in other embodiments.

In step 304, a preprocessing operation is performed by aggregating the traces according to source and destination time granularities, and for each data set estimating the skew for the various time granularities. The resulting estimates are examples of what are also referred to herein as skew measurements. Additional unique features of the traces may also be calculated or otherwise determined in this operation and associated with the skew measurements for use in generating the predictive model.

Examples of the above-noted additional unique features include skew characteristics such as active capacity, total capacity, ratio of read and write operations, total IO operations and minimum IO operations. One or more of these skew characteristics can be used as respective features in a machine learning regression algorithm for generating the predictive model. Other embodiments can utilize additional or alternative features in characterizing the skew for purposes of machine learning.

In some embodiments, the source and destination time granularities comprise respective 6H and 12H granularities, where "source" in this context refers to the storage tier on which the data set currently resides and "destination" refers to the storage tier to which it is proposed that the data set be moved. The IO activity traces are further aggregated by offset, where each offset may be on the order of, for example, 8 megabytes (MB).

Skew may be estimated for each time granularity by sorting the aggregate IO amounts in decreasing order, generating a set of ordered pairs of the form (capacity ratio, aggregate IO ratio), and evaluating the skew for the particular time granularity by fitting an exponential function to the set of ordered pairs using a nonlinear least squares model. This is also referred to as extracting a skew definition from the skew measurements. By way of example, the skew definition may comprise parameter a of a fitted exponential function given by $1-e^{ax}$. Other functions may be used in other embodiments. Like one or more of the above-noted skew characteristics, the extracted parameter a is used as a feature in a machine learning regression algorithm for generating the predictive model.

In step 306, a model fitting operation is performed by training a plurality of different machine learning regression algorithms using the skew measurements, evaluating each of the predictive models based on a specified error function, and selecting an optimal predictive model. The machine learning regression algorithms are implemented in model generator 120 in the FIG. 1 embodiment.

Examples of machine learning regression algorithms that may be used in illustrative embodiments include the K Nearest Neighbors (KNN) algorithm, and the Recursive Partitioning and Regression Trees (RPART) algorithm. Such machine learning regression algorithms can be implemented at least in part using the R programming language or other suitable programming techniques. Other embodiments can implement only a single machine learning regression algorithm. Also, other types of machine learning can be used in place of regression in other embodiments.

As mentioned previously, the model generation portion of the process 300 illustratively involves extracting from at least a portion of the skew measurements for a given one of the time granularities a skew definition comprising a parameter of a fitted exponential function wherein the parameter is utilized as a feature in a machine learning regression algorithm for generating the predictive model. Other unique features corresponding to skew characteristics determined in step 304 can also be used as features in the machine learning regression algorithm for generating the predictive model.

The fitting operation in step 306 is an example of an arrangement in which the predictive model is generated by training a machine learning regression algorithm for each of a plurality of candidate models using a first part of the IO activity traces, evaluating the candidate models using a second part of the IO activity traces and an error function, and selecting a particular one of the candidate models as the predictive model based on the results of the evaluating of the candidate models.

As a more particular example, for each regression algorithm, the corresponding predictive model can be trained in the following manner. First, randomly select 80% of the input IO activity trace data as the training data. The remaining 20% serves as the test data for evaluating the performance of the trained predictive model. Each model is trained and evaluated using a particular combination of skew measurements and possibly other unique features. The corresponding machine learning regression algorithm is executed using the training data and the resulting predictive model is evaluated using the test data. The evaluation can be done using an error function that calculates mean square distance between corresponding points of the measured and predicted curves. The particular predictive model that minimizes the error function is then selected for implementation. Various cost functions can be utilized for this purpose, and are considered examples of "error functions" as that term is broadly used herein.

In step 308, the output is the selected predictive model that minimizes the error function as determined in the fitting operation. This predictive model is supplied by the model generator 120 to the skew predictor 122 in the context of the FIG. 1 embodiment. By way of example, the predictive model may be configured to predict skew in 12H time granularity based on two measured skews in 6H time granularity.

The selected predictive model is applied in the application portion of the process 300, utilizing steps 310, 312 and 314.

In step 310, the input to the application portion of the process includes the predictive model output from step 308, skew measurements in one time granularity to be converted to skew measurements in another time granularity, and any additional unique features previously determined in step 304.

In step 312, a predicting operation is performed by applying the predictive model to the input skew measurements.

In step 314, the output is the skew in the required time granularity, which is different than the time granularity of the input skew of step 310. Accordingly, in the context of the FIG. 1 embodiment, skew predictor 122 applies the predictive model determined by the model generator 120 in order to predict skew measurements in one time granularity using input skew measurements in another time granularity. As mentioned previously, such prediction is also referred to herein as generating converted skew measurements based on the predictive model.

Figure 5:
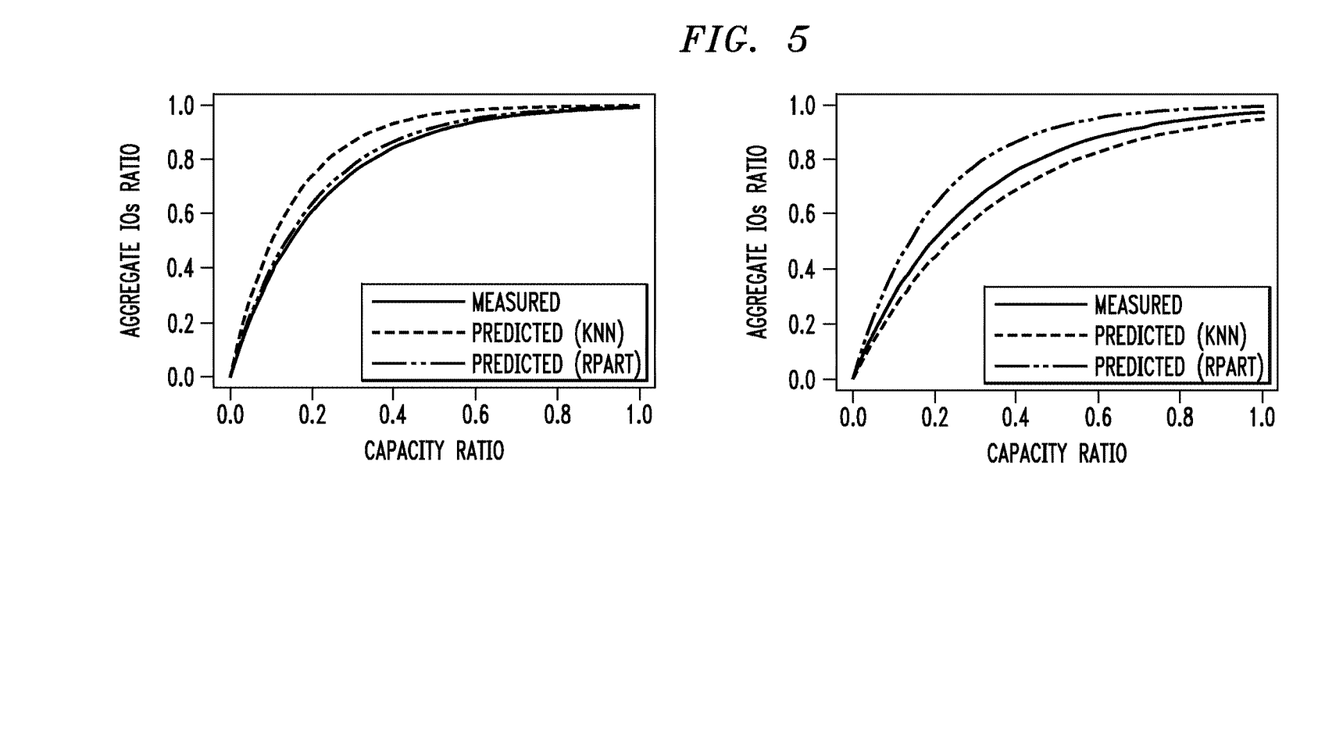
FIG. 5 shows a number of graphical plots each comparing measured and predicted skew in illustrative embodiments.

Examples of measured and predicted skew generated using the processes of FIGS. 2 and 3 are shown in the graphical plots of FIG. 5. Each of these plots shows aggregate IO ratio over a designated time period as a function of capacity ratio for a given data set and includes three curves, one corresponding to measured skew in 12H time granularity and the other two corresponding to predicted skew in 12H time granularity determined using respective KNN and RPART algorithms. In the plot on the left hand side of the figure, the lower curve is the measured skew, the upper curve is the predicted skew using the KNN algorithm, and the middle curve is the predicted skew using the RPART algorithm. In the plot on the right hand side of the figure, the middle curve is the measured skew, the lower curve is the predicted skew using the KNN algorithm, and the upper curve is the predicted skew using the RPART algorithm.

A given point on one of the curves represents a skew value, generally representing the corresponding percentage of IO activity associated with the corresponding percentage of data storage capacity in a designated portion of one of the storage tiers. The values of the predicted skew curve in each plot are generated by applying the predictive model to corresponding measured skew values.

The particular processing operations and other system functionality described in conjunction with the flow diagrams of FIGS. 2 and 3 are presented by way of illustrative example only, and should not be construed as limiting the scope of the invention in any way. Alternative embodiments can use other types of processing operations involving one or more data mover modules associated with a plurality of storage tiers of a storage system. For example, the ordering of the process steps may be varied in other embodiments, or certain steps may be performed concurrently with one another rather than serially. Also, one or more of the process steps may be repeated periodically for different skew prediction contexts, or performed in parallel with one another.

It is to be appreciated that functionality such as that described in conjunction with the flow diagrams of FIGS. 2 and 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The above-described illustrative embodiments provide significant improvements relative to conventional arrangements. For example, one or more such embodiments can improve the performance of a multi-tier storage system by providing more accurate and efficient movement of data based on predicted skew measurements.

Also, the use of skew prediction in some illustrative embodiments advantageously avoids situations in which the need for actual skew measurements might otherwise utilize excessive computation resources of the storage system.

In addition, skew in a wide variety of different time granularities can be predicted using measured skew in only relatively few granularities. Such arrangements can accommodate the significant variations in skew measurements that are provided by different types of storage arrays or other storage tiers in multi-tier storage systems. This simplifies the integration of different types of storage technologies into respective storage tiers.

Data movement based on predicted skew measurements in illustrative embodiments can facilitate implementation of techniques such as FAST, HSM, data migration, storage planning, LUN federation using different storage technologies, and many other techniques involving data movement between storage tiers. As a result, storage system performance can be improved while costs are reduced.

It is to be appreciated that the particular system components, process operations and associated skew prediction and data movement functionality illustrated in FIGS. 1-5 are exemplary only, and numerous other arrangements may be used in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of the information processing system of FIG. 1, as well as other information processing systems in other embodiments of the invention.

Figure 6:
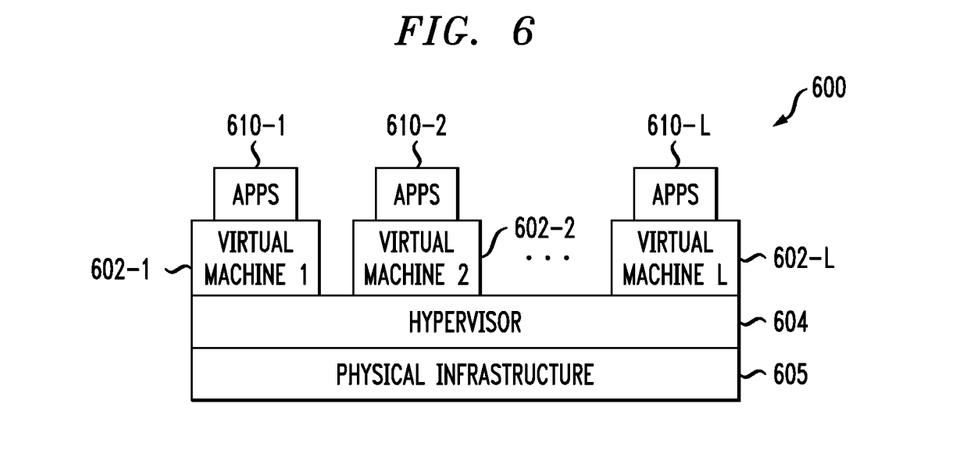
FIGS. 6 and 7 show examples of processing platforms that may be utilized to implement at least parts of an information processing system in illustrative embodiments.
Figure 7:
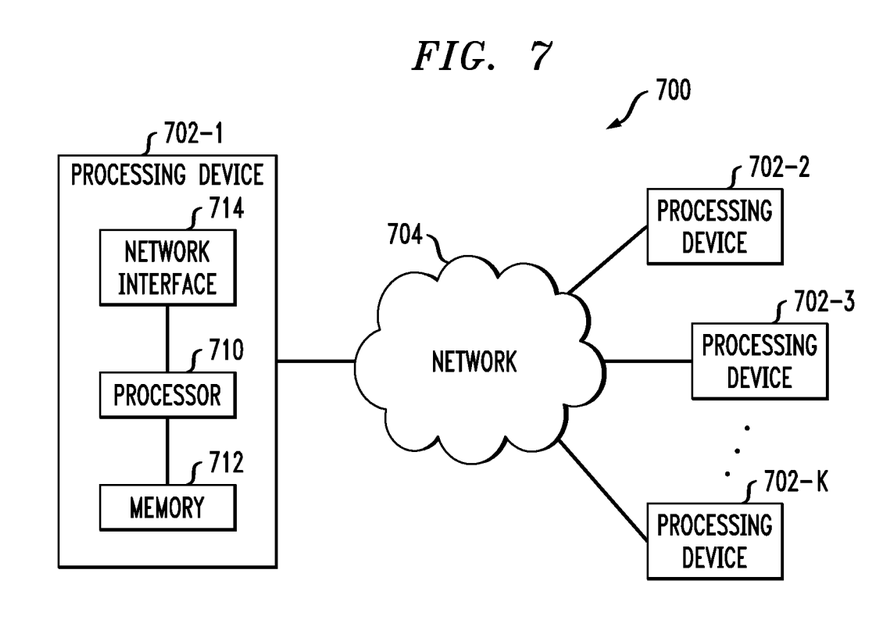

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a data mover module or an associated front-end or back-end file system as disclosed herein can be implemented at least in part in the form of one or more software programs stored in memory and executed by a processor of a processing device such as one of the virtual machines 602 or one of the processing devices 702. For example, the data mover modules 106 and the machine learning system 110 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and multi-tier storage systems in which it is desirable to provide accurate and efficient skew prediction and data movement functionality. Also, the particular configurations of system and device elements shown in FIGS. 1, 6 and 7 and the process operations shown in FIGS. 2 and 3 can be varied in other embodiments. Thus, for example, the particular type of storage tiers, data mover modules and machine learning systems deployed in a given embodiment and their respective configurations may be varied. Other features of the illustrative embodiments such as activity trace formats and skew measurement formats can also be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a plurality of storage tiers each comprising a plurality of storage drives;
at least one data mover module coupled to the storage tiers and configured to control transfer of data between the storage tiers; and
a machine learning system coupled to the at least one data mover module;
the machine learning system comprising:
a model generator configured:
to process information characterizing input-output activity involving one or more of the storage tiers in order to obtain skew measurements in a plurality of different time granularities with the skew measurements indicating portions of the input-output activity directed to portions of the one or more storage tiers; and
to generate a predictive model from the skew measurements; and
a skew predictor configured in accordance with the predictive model generated by the model generator to convert skew measurements in one of the time granularities to corresponding skew measurements in another one of the time granularities;
wherein one or more of the converted skew measurements are utilized by the at least one data mover module in controlling transfer of data between the storage tiers from a first one of the storage tiers exhibiting a relatively high level of skew to a second one of the storage tiers selected to provide a reduced level of skew compared to the relatively high level of skew;
wherein the reduced level of skew provides improved input-output performance of input-output requests directed to at least one of the first and second storage tiers relative to input-output performance of input-output requests directed to said at least one of the first and second storage tiers prior to transfer of the data from the first storage tier to the second storage tier; and
wherein the at least one data mover module and the machine learning system are implemented using at least one processing device comprising a processor coupled to a memory.

2. The apparatus of claim 1 wherein the plurality of time granularities comprises at least a first time granularity specified as a first time period having a first number of hours and a second time granularity specified as a second time period having a second number of hours different than the first number of hours.

3. The apparatus of claim 1 wherein the first and second storage tiers are part of the same storage array.

4. The apparatus of claim 1 wherein the first and second storage tiers are part of respective different storage arrays that utilize respective different ones of the time granularities for generation of skew measurements.

5. The apparatus of claim 1 wherein the at least one data mover module is configured to control migration of at least a portion of the data from one or more of the storage tiers in a first storage system that utilizes a first one of the time granularities for generation of skew measurements to one or more other storage tiers of a different storage system that utilizes a second one of the time granularities for generation of skew measurements.

6. The apparatus of claim 1 wherein the predictive model utilizes first and second skew measurements of a first one of the time granularities to predict a corresponding skew measurement in a second one of the time granularities.

7. The apparatus of claim 1 wherein the information characterizing input-output activity involving the storage tiers comprises traces of input-output activity with each such trace relating to a particular logical unit of at least one of the storage tiers.

8. The apparatus of claim 7 wherein a given one of the traces comprises a time period identifier, a logical unit identifier, an offset, a number of read operations directed to the offset of the identified logical unit for the identified time period and a number of write operations directed to the offset of the identified logical unit for the identified time period.

9. The apparatus of claim 1 wherein a given one of the skew measurements specifies a percentage of input-output activity associated with a percentage of data storage capacity in a designated portion of at least one of the storage tiers.

10. The apparatus of claim 1 wherein a given one of the skew measurements comprises a point in two-dimensional space having a first dimension given by aggregate input-output ratio and a second dimension given by capacity ratio.

11. The apparatus of claim 1 wherein the predictive model comprises a plurality of conversion tables for use in converting skew measurements in one of the time granularities to skew measurements in another one of the time granularities.

12. The apparatus of claim 1 further comprising extracting from at least a portion of the skew measurements for a given one of the time granularities a skew definition comprising a parameter of a fitted exponential function wherein the parameter is utilized as a feature in a machine learning regression algorithm for generating the predictive model.

13. The apparatus of claim 1 further comprising extracting from at least a portion of the skew measurements for a given one of the time granularities a plurality of skew characteristics including one or more of active capacity, total capacity, ratio of read and write operations, total input-output operations and minimum input-output operations wherein at least one of the skew characteristics is utilized as a feature in a machine learning regression algorithm for generating the predictive model.

14. The apparatus of claim 1 wherein the predictive model is generated by training a machine learning regression algorithm for each of a plurality of candidate models using a first part of the information characterizing input-output activities, evaluating the candidate models using a second part of the information characterizing input-output activities and an error function, and selecting a particular one of the candidate models as the predictive model responsive to results of the evaluating of the candidate models.

15. An information processing system comprising the apparatus of claim 1 and a plurality of compute nodes comprising applications that generate at least a portion of the input-output activity involving the storage tiers.

16. A method comprising:
processing information characterizing input-output activity involving one or more of a plurality of storage tiers each comprising a plurality of storage drives in order to obtain skew measurements in a plurality of different time granularities with the skew measurements indicating portions of the input-output activity directed to portions of the one or more storage tiers;
generating a predictive model from the skew measurements;
converting additional skew measurements in one of the time granularities to corresponding skew measurements in another one of the time granularities using the predictive model; and
controlling transfer of data between the storage tiers based at least in part on one or more of the converted skew measurements, including transfer from a first one of the storage tiers exhibiting a relatively high level of skew to a second one of the storage tiers selected to provide a reduced level of skew compared to the relatively high level of skew;
wherein the reduced level of skew provides improved input-output performance of input-output requests directed to at least one of the first and second storage tiers relative to input-output performance of input-output requests directed to said at least one of the first and second storage tiers prior to transfer of the data from the first storage tier to the second storage tier; and
wherein the processing, generating, converting and controlling are implemented using at least one processing device comprising a processor coupled to a memory.

17. The method of claim 16 wherein the predictive model utilizes first and second skew measurements of a first one of the time granularities to predict a corresponding skew measurement in a second one of the time granularities.

18. The method of claim 16 wherein the predictive model comprises a plurality of conversion tables for use in converting skew measurements in one of the time granularities to skew measurements in another one of the time granularities.

19. A computer program product comprising a non-transitory processor-readable storage medium having stored therein program code of one or more software programs, wherein the program code when executed by at least one processing device causes said processing device:
to process information characterizing input-output activity involving one or more of a plurality of storage tiers each comprising a plurality of storage drives in order to obtain skew measurements in a plurality of different time granularities with the skew measurements indicating portions of the input-output activity directed to portions of the one or more storage tiers;
to generate a predictive model from the skew measurements;
to convert additional skew measurements in one of the time granularities to corresponding skew measurements in another one of the time granularities using the predictive model; and
to control transfer of data between the storage tiers based at least in part on one or more of the converted skew measurements, including transfer from a first one of the storage tiers exhibiting a relatively high level of skew to a second one of the storage tiers selected to provide a reduced level of skew compared to the relatively high level of skew;
wherein the reduced level of skew provides improved input-output performance of input-output requests directed to at least one of the first and second storage tiers relative to input-output performance of input-output requests directed to said at least one of the first and second storage tiers prior to transfer of the data from the first storage tier to the second storage tier.

20. The computer program product of claim 19 wherein the predictive model utilizes first and second skew measurements of a first one of the time granularities to predict a corresponding skew measurement in a second one of the time granularities.

* * * * *